United States Patent [19]

Sato et al.

[11] Patent Number: 4,967,028
[45] Date of Patent: Oct. 30, 1990

[54] ELECTRICAL INSULATING OIL COMPOSITION AND ELECTRICAL APPLIANCES IMPREGNATED THEREWITH

[75] Inventors: Atsushi Sato, Tokyo; Shigenobu Kawakami, Ichikawa; Keiji Endo, Yokosuka; Hideyuki Dohi, Yokohama, all of Japan

[73] Assignee: Nippon Petrochemicals Company, Limited, Tokyo, Japan

[21] Appl. No.: 191,054

[22] Filed: May 6, 1988

[51] Int. Cl.$^5$ .................... H01G 4/22; H01B 3/22
[52] U.S. Cl. ................... 585/6.3; 174/17 LF; 174/25 R; 174/25 C; 336/94; 361/315; 361/327; 585/24; 585/25
[58] Field of Search ............. 585/6.3, 24, 25; 361/315, 327; 174/17 LF, 25 R, 25 C; 336/94

[56] References Cited

U.S. PATENT DOCUMENTS

| | | | |
|---|---|---|---|
| 4,108,788 | 8/1978 | Schulz et al. | 585/6.3 |
| 4,111,824 | 9/1978 | Schulz et al. | 585/24 |
| 4,111,825 | 9/1978 | Schulz et al. | 585/24 |
| 4,568,793 | 2/1986 | Sato et al. | 585/24 |
| 4,642,730 | 2/1987 | Sato et al. | 585/25 |

FOREIGN PATENT DOCUMENTS 0260702  2/1988  European Pat. Off.

*Primary Examiner*—Asok Pal
*Attorney, Agent, or Firm*—Scully, Scott, Murphy & Presser

[57] ABSTRACT

The present invention relates to an improved electrical insulating oil composition which has excellent electrical characteristics and is suitable for use in impregnating electrical appliances in which plastic dielectric material is used, and further relates to electrical appliances impregnated with such a composition. The electrical insulating oil composition is produced by bringing a by-product oil fraction mainly containing components having boiling points in the range of 260° to 330° C. (atmospheric pressure basis) into liquid-liquid contact with an organic polar solvent; said by-product oil fraction being formed by alkylating benene or toluene with ethylene in the presence of an alkylation catalyst and then distilling the alkylation product; and said electrical insulating oil composition being characterized in that the ratio of the integrated intensity as chemical shift at 120 to 155 ppm of the spectrum measured by $^{13}$C NMR method to the total integrated intensity at 0 to 155 ppm of said spectrum is 70% or higher.

17 Claims, No Drawings

ELECTRICAL INSULATING OIL COMPOSITION AND ELECTRICAL APPLIANCES IMPREGNATED THEREWITH

BACKGROUND OF THE INVENTION

1. Field of the Invention

This invention relates to an electrical insulating oil composition which is prepared by bringing, into liquid-liquid contact with a polar solvent, a by-product oil fraction formed in the manufacture of ethylbenzene, ethyltoluene, cumene and the like, and furthermore it relates to electrical appliances impregnated with the above electrical insulating oil composition.

2. Description of the Prior Art

Heretofore, it is known that a heavy by-product oil is produced in the process to prepare ethylbenzene, ethyltoluene and the like by alkylating benzene, toluene and the like.

For example, it is disclosed in U.S. Pat. No. 4,111,825 to use, as an electrical insulating oil, a by-product oil in a benzene manufacture process to alkylate benzene with ethylene in the presence of, for example, an aluminum chloride catalyst, and similarly, U.S. Pat. No. 4,568,793 discloses that a by-product oil in an ethyltoluene manufacture process to alkylate toluene with ethylene is used as an electrical insulating oil.

On the other hand, oil-filled electrical appliances such as oil-filled capacitors recently have a noticeable tendency toward small size and lightweight, and in reply to this tendency, plastic materials for insulators and dielectrics have been developed and are now used together with or in place of conventional insulating papers.

Electrical insulating oils with which electrical appliances are impregnated also involve various problems in being used together with the above-mentioned plastic materials. That is, conventional electrical insulating oils, for example, refined mineral oils, polybutenes, alkylbenzenes and the like are not satisfactorily applied to plastic materials of polyolefins such as polypropylene, polymethylpentene and polyethylene which are used in the oil-filled electrical appliances. Some of these conventional electrical insulating oils dissolve or swell these plastic materials to deteriorate insulating power of the oil-filled electrical appliances on occasions.

None of the electrical insulating oils disclosed in the above-mentioned publications are preferable for the reason just described. For example, the above-mentioned publication, U.S. Pat. No. 4,568,793 disclosing the by-product oil of ethyltoluene refers to the excellent applicability of the oil to the plastic materials, but it is not always satisfactory and contains room for further improvement. This unsatisfactory effect would be due to some causes, and one of them is based on the by-product containing many components, chemical structurs of which are still unidentified. These unidentified components are inevitably contained in the by-product oil even when distillation is performed elaborately, and they cannot be identified. The inventors of the present application have found that certain components in the by-product oil deteriorate electrical properties of the by-product itself, for example, compatibility with the plastic materials.

With regard to the components in question, perfect identification of their structures is in fact impossible. Although the perfect removal of these components therefrom would not be impossible, but in such a case, extremely precise distillation is required, which is not economical.

BRIEF SUMMARY OF THE INVENTION

In view of the hereinbefore discussed situations, the present inventors have made researches to remove unpreferable components present in a by-product oil and to thereby improve electrical properties of the by-product oil, and as a result, this invention has been achieved.

That is, this invention is directed to an electrical insulating oil composition produced by bringing a by-product oil fraction mainly containing components with boiling points in the range of 260° to 330° C. (atmospheric pressure basis) into liquid-liquid contact with an organic polar solvent. The aforesaid by-product oil fraction is formed by first preparing an alkylated product composed of unreacted benzene or unreacted toluene, ethylbenzene or ethyltoluene, polyalkylbenzenes and heavy components by alkylating benzene or toluene with ethylene in the presence of an alkylation catalyst, and then distilling off unreacted benzene or unreacted toluene, ethylbenzene or ethyltoluene and most of polyalkylbenzenes from the alkylated product. The foregoing electrical insulating oil composition is such that the ratio of the integrated intensity as chemical shift at 120 to 155 ppm of the spectrum measured by $^{13}$C NMR method to the total integrated intensity at 0 to 155 ppm of the spectrum is 70% or higher. Furthermore, this invention is directed to an electrical appliances impregnated with the above electrical insulating oil composition.

DETAILED DESCRIPTION OF THE INVENTION

It is now practiced out on an industrial scale that benzene and toluene are alkylated with the aid of an alkylation catalyst to prepare ethylbenzene and ethyltoluene which are raw materials in the field of petrochemistry. The by-product oil of this invention can be exemplified by those which are formed in such a manufacturing process.

To say more specifically, the above-mentioned alkylation is usually performed in accordance with a liquid phase alkylation process or a gaseous phase alkylation process. In the case of the liquid phase alkylation process, there are used a Friedel-Crafts catalyst such as aluminum chloride and a Brønsted acid such as sulfuric acid, toluenesulfonic acid and hydrofluoric acid, and in the gaseous phase alkylation process, a synthetic zeolite, for example, ZSM-5 type zeolite such as ZSM-5 and a suitable carrier supporting phosphoric acid are used. A reaction temperature is usually in the range of 20° to 180° C. in the case of the liquid phase alkylation process, and it is in the range of 250° to 450° C. in the case of the gaseous phase alkylation process.

After the alkylating reaction, there can be obtained an alkylated product which is composed of unreacted benzene or toluene, the aimed ethylbenzene or ethyltoluene, additionally polyalkylbenzene other than ethyltoluene such as polyethylbenzene or polyethyltoluene, and heavy components. The used catalyst, if necessary, is removed from the alkylated product, followed by neutralizing and water washing. Next, distillation under reduced pressure or atmospheric pressure is carried out to remove, from the alkylated product, unreacted benzene or toluene, aimed ethylbenzene or ethyltoluene, and most of a polyalkylbenzene other than ethyltoluene such as polyethylbenzene or polyethyltoluene, thereby obtaining a by-product oil fraction.

The by-product may be directly prepared by distillation from the alkylated product, or may be recovered by distilling off alkylbenzenes as light components from the alkylated product, removing tars as heavy components to once recover a by-product oil, and distilling this by-product oil again.

In any case, the by-product which will be treated in this invention mainly contains components having boiling points (atmospheric pressure basis) in the range of 250° to 350° C., preferably 260° to 330° C.

Depending upon the limited boiling point, the by-product oil fraction is supposed to be a hydrocarbon mixture containing partially polyethylbenzene and polyethyltoluene, and additionally containing indane derivatives, diaryl or triarylalkane derivatives and polyalkylpolyphenyl derivatives, and so forth.

With regard to the by-product oil fraction which contains components having boiling points of lower than 250° C. and the by-product oil fracation which contains components having boiling points of higher than 350° C., their electrical properties are on a low level and cannot be improved even when they are treated by the liquid-liquid contact treatment of this invention.

The above-mentioned alkylated product contains very heavy components such as tarry substances, but the latter can be removed therefrom by setting the boiling point within the above range.

The thus obtained by-product oil fraction is not always satisfactory as a raw material for the oil-filled electrical appliances, because of the existence of some components, structures of which have not been identified yet, as described above.

Thus, in this invention, the by-product oil fraction is brought into liquid-liquid contact with an organic polar solvent. This contact treatment remarkably improves the electrical properties of the by-product oil fraction. The organic polar solvent used in the liquid-liquid contact of this invention preferably has a solubility parameter of $5.1 \times 10^{-3}$ $(J/m^3)^{0.5}$ or higher.

Typical examples of the organic polar solvents include alcohols such as methanol, ethanol, 1-propanol, 2-propanol, 1-butanol, 2-butanol, isobutanol and furfuryl alcohol, glycols such as ethylene glycol, propylene glycol, diethylene glycol and triethylene glycol, ketones such as acetone and methyl ethyl ketone, Cellosolves such as ethylene glycol monomethyl ether and ethylene glycol monoethyl ether, ethers such as furfural, sulfolane, dimethylsulfoxide (DMSO), acetonitrile, N-methylpyrrolidone (NMP) and dimethylformamide (DMF). They may be used singly or in a mixture thereof. Moreover, the addition of a suitable amount of water to the organic solvent is preferable because of heightening the effect of the abovementioned contact treatment, and the amount of water to be added is in the range of 50 wt % or lower, preferably 40 wt % or lower, with respect to the organic solvent.

In the presence of the above-mentioned polar solvent, the by-product oil fraction is subjected to the liquid-liquid contact treatment. As an actual means for the liquid-liquid contact, there is used, for example, a liquid-liquid extraction or an extractive distillation.

In the liquid-liquid extraction in the presence of the polar solvent, the desired electrical insulating oil of this invention is recovered as an extract. Therefore, after the extraction with the aid of the polar solvent, the desired electrical insulating oil can be recovered by a suitable procedure, for example, by the distillation and the addition of a third component to separate the polar solvent therefrom.

Also in point of the feature that the aimed electrical insulating oil is recovered as the extract, the liquid-liquid contact of this invention should be apparently distinguished from a mere solvent purification technique which is used for the electrical insulating oil comprising mineral oils.

The liquid-liquid extraction can be carried out by the use of a usual batch type or continuous type counter flow extraction tower, a multi-stage extraction tower or the like. After the liquid-liquid extraction, the used polar solvent is separated and removed in an ordinary manner, thereby obtaining the electrical insulating oil of this invention.

The aforesaid extractive distillation can be accomplished by adding the above-mentioned polar solvent to the by-product oil fraction, followed by a usual extractive distillation. For example, the extractive distillation is achieved by first introducing the organic polar solvent through an inlet in the vicinity of the top of a distillation tower thereinto, and then distilling the by-product oil fraction, while the latter is in contact with the solvent present allover in the tower.

In the liquid-liquid contact under the polar solvent, a composition of the obtained oil depends upon a kind of used polar solvent and other conditions such as an extraction temperature and an amount of the polar solvent with respect to the by-product oil fraction. In general, for example, the extraction temperature is in the range of 10° to 150° C., and the amount of the polar solvent is in the range of 1 to 30 parts by weight per part by weight of the by-product oil fraction. Furthermore, in the extractive distillation, the polar solvent is used in an amount of 1 to 30 parts by weight per part by weight of the by-product oil fraction, and in general, 20 or more separation stages are preferably employed under a reduced pressure of 100 mmHg or lower.

In this invention, the above-mentioned conditions for the liquid-liquid contact operation should be selected so that the electrical insulating oil may be obtained in which the ratio of the integrated intensity as chemical shift at 120 to 155 ppm of the spectrum measured by $^{13}C$ NMR method to the total integrated intensity at 0 to 155 ppm of the spectrum is 70% or higher, preferably 72% or higher. When the above defined ratio is lower than 70%, the effect of the liquid-liquid contact treatment with the organic polar solvent cannot be obtained sufficiently.

As described hereinbefore, the by-product oil fraction of this invention is the hydrocarbon mixture containing the structurally unidentified components, and even by the liquid-liquid contact of this invention, all of these unidentified components are not removed therefrom. However, since the ratio of the integrated intensities by the $^{13}C$ NMR method is specified, the unpreferable unidentified components are eliminated therefrom, and the remaining components interacts on one another so as to exert a synergistic effect. Thus, the aforesaid procedure can provide the electrical insulating oil having excellent electrical properties.

A conventional solvent purification for the insulating oil is different from that of this invention in that the conventional case intends to prepar a raffinate. In addition, the conventional purification technique contemplates decreasing the amount of aromatics, but in the liquid-liquid contact of this invention, the amount of aromatics is rather finally increased. Also in this point, the liquid-liquid contact of this invention should be distinguished from the conventional technique.

Here, reference to the $^{13}$C NMR method will be made. A measurement temperature is usually ordinary temperature. A fraction which is a sample to be measured is dissolved in deuterated chloroform which is a solvent for the measurement so that the concentration of the fraction may be 10 to 20% by volume. A frequency for the measurement can be suitably changed but it is, for example, 67.8 MHz. In an obtained $^{13}$C NMR spectrum, an integrated intensity as chemical shift at 120 to 155 ppm thereof is determined, using tetramethylsilane as standard, and the ratio (%) of the thus obtained value to the total integrated intensity at 0 to 155 ppm of the total spectrum except that of the solvent, is calculated. The calculated value is rounded at the first decimal place. In order to heighten the quantitative reliability of the measurement, there is usually employed a proton perfect decoupling process in which a nuclear Overhauzer effect is eliminated.

The thus prepared electrical insulating oil is then purified, if necessary, and is preferably used as an oil with which capacitors are impregnated.

Moreover, the electrical insulating oil of this invention may be mixed with conventional electrical insulating oils, for example, diarylalkane, alkylbiphenyl or alkylnaphthalene in an optional ratio in compliance with uses and other conditions. The electrical insulating oil composition of this invention can be employed as an impregnating material to oil-filled electrical appliances such as oil-filled capacitors and oil-filled cables.

The oil-filled capacitors to which the composition of this invention can be preferably applied are those in which at least a part of dielectric is composed of a plastic material. Preferable examples of the plastic materials include polyolefins such as polyethylene and polymethylpentene, and a more preferable one is polypropylene. For example, the oil-filled capacitors can be manufactured by first winding a polypropylene film together with a metal foil such as an aluminum foil which is a conductor, if necessary, using an insulating paper, and then impregnating the wound material with the above-mentioned electrical insulating oil in an ordinary manner. Furthermore, the above-mentioned suitable capacitors include oil-filled capacitors manufactured by the other procedure in which a metallized plastic film such as a metallized polypropylene film is wound together with an insulating paper or a plastic film, and is then impregnated with the electrical insulating oil.

In oil-filled capacitors using a plastic material, physical properties of the by-product oil fraction which are not always suitable for impregnation are remarkably improved, and hence oil-filled capacitors impregnated with the electrical insulating oil of this invention are excellent in corona discharge properties, low-temperature properties and the like.

Now, this invention will be described in detail in reference to examples.

EXAMPLES

- By-Product Oil Fraction A -

From a process of alkylating benzene with ethylene in the presence of aluminum chloride in accordance with a liquid phase alkylation method to prepare ethylbenzene, an alkylated product was obtained which was composed of 43.0% by weight of unreacted benzene, 11.8% by weight of ethylbenzene, 18.3% by weight of polyethylbenzene and 7.6% by weight of heavier components. Distillation was then carried out to remove unreacted benzene, ethylbenzene and polyethylbenzene from this alkylated product. A by-product oil which was the residue of the alkylated product contained tarry substances and was black and viscous. This oil was further distilled under reduced pressure, thereby recovering by-product oil fraction A shown in Table 1.

- By-Product Oil Fraction B -

From a process of alkylating toluene with ethylene at a reaction temperature of 450° C. by the use of the syntheric zeolite ZSM-5 produced in the manner described in U.S. Pat. No. 3,926,782, (H+ type; silica/alumina molar ratio=60) as a catalyst in order to prepare ethyltoluene, an alkylated product was obtained which was composed of unreacted toluene, ethyltoluene, polyethyltoluene and a by-product oil. This alkylated product was distilled to remove therefrom a fraction having a boiling point of less than 250° C. and containing unreacted toluene, ethyltoluene and polyethyltoluene, whereby a by-product oil was recovered. Successively, a by-product oil fraction B having a boiling point range shown in Table 1 was obtained from the thus recovered by-product oil.

- Liquid-Liquid Extraction -

Extraction Process I

A polar solvent and a by-product oil fraction were mixed with each other in a weight ratio of 1:1, and the mixture was then shaken sufficiently in a separatory funnel and a raffinate was removed therefrom. Afterward, the mixture was washed with n-hexane to recover, as a raffinate, an oil from which the used polar solvent had been removed. This operation was repeated thrice, thereby obtaining an electrical insulating oil.

Extraction Process II

A polar solvent and a by-product oil fraction were mixed with each other in a weight ratio of 1:1, and the mixture was then shaken sufficiently in a separatory funnel and a raffinate was removed therefrom. Afterward, the used polar solvent was removed by flash distillation. This operation was repeated thrice, thereby recovering an electrical insulating oil from the by-product oil fraction.

- Measurement by $^{13}$C NMR Method -

Each fraction was dissolved in a solvent of deuterated chloroform so that the concentration of the fraction might be 15%, and measurement was then carried out at room temperature by the use of a GX-270 model $^{13}$C NMR measuring device made by JEOL, Ltd.

Frequency: 67.8 MHz

In this case, in order to heighten quantitative reliability of the measurement, there was employed a proton perfect decoupling process in which a nuclear Overhauzer effect had been eliminated.

In an obtained $^{13}$C NMR spectrum, there was sought the ratio (%) of an integrated intensity as chemical shift at 120 to 155 ppm the spectrum to the total integrated intensity at 0 to 155 ppm thereof. The results are shown in Table 1. In this case, tetramethylsilane was employed as the standard of the chemical shift.

- Compatibility with Polypropylene Film -

Polypropylene films (thickness 14 microns) cut into a predetermined shape were dipped in each fraction at 80° C. for 72 hours, and after they were taken out therefrom, swelling ratios (%) of the films were then calculated from measured values of the films before and after the dipping step. The results are shown in Table 2. The smaller the values of the swelling ratios are, the greater the effect of inhibiting the films from swelling is, which means that dimensional stability of the films is excellent and which further means that the compatibility with polypropylene is good.

- Measurement of Corona Starting Voltage: CSV and Corona Ending Voltage: CEV -

As a dielectric, a sheet comprising two polypropylene films each having a thickness of 14 microns was used, and an aluminum foil which was an electrode was wound with and laminated to the sheet in an ordinary manner in order to prepare model capacitors for oil impregnation.

These capacitors were impregnated with the respective fractions under vacuum to prepare oil-filled capacitors each having a capacitance of 0.4 microfarad.

For each of these capacitors, a corona starting voltage and a corona ending voltage were measured at a temperature of −35° C. The results are shown in Table 2.

- Lifetime Test of Capacitors -

As a dielectric, a sheet comprising two polypropylene films each having a thickness of 14 microns was used, and an aluminum foil which was an electrode was wound with and laminated to the sheet in an ordinary manner in order to prepare model capacitors for oil impregnation.

These capacitors were impregnated with the respective fractions under vacuum to prepare oil-filled capacitors each having a capacitance of 0.4 microfarad.

Afterward, a predetermined alternating voltage was applied to each of these capacitors at −35° C. and a time was measured until the capacitor was broken, and a lifetime of each capacitor was sought. In this case, a potential gradient was increased from a level of 80 V/$\mu$ by 10 V/$\mu$ every 48 hours, and at this time, the number of the broken capacitors was counted. The number of the capacitors at the start was 10 in each case. The results are shown in Table 2.

TABLE 1

| Insulating Oil No. | By-Product Oil Fraction (Boiling Point, °C.) | Polar Solvent | Extraction Method | Ratio (%)* |
|---|---|---|---|---|
| 1 | By-Product Oil Fraction A (265–320° C.) | Methanol with 10% of Water | II | 80.9 |
| 2 | By-Product Oil Fraction A (265–320° C.) | Ethanol with 10% of Water | I | 80.7 |
| 3 | By-Product Oil Fraction A (265–320° C.) | Methyl Cellosolve | I | 80.0 |
| 4 | By-Product Oil Fraction A (265–320° C.) | Diethylene Glycol | I | 80.4 |
| 5 | By-Product Oil Fraction A (265–320° C.) | Triethylene Glycol | I | 80.1 |
| 6 | By-Product Oil Fraction A (265–320° C.) | Sulfolane with 10% of Water | I | 80.1 |
| 7 | By-Product Oil Fraction A (265–320° C.) | DMSO with 5% of Water | II | 80.3 |
| 8 | By-Product Oil Fraction A (265–320° C.) | NMP with 20% of Water | II | 80.3 |
| 9 | By-Product Oil Fraction A (265–320° C.) | IPA with 30% of Water | I | 80.7 |
| 10 | By-Product Oil Fraction A (265–320° C.) | Furfural | I | 80.5 |
| 11 | By-Product Oil Fraction A (265–320° C.) | Acetonitrile | I | 80.6 |
| 12 | By-Product Oil Fraction A (265–320° C.) | Acetone with 30% of Water | II | 80.1 |
| 13 | By-Product Oil Fraction A (265–320° C.) | DMF | I | 80.1 |
| 14 | By-Product Oil Fraction B (275–310° C.) | Triethylene Glycol | I | 78.0 |
| 15 | Diphenyl Ethane | | | |
| 16 | 1-Phenyl-1-ethylphenylethane | | | |
| 17 | By-product Oil Fraction A (unextracted) | | | |
| 18 | By-product Oil Fraction B (unextracted) | | | |

*Ratio (%) of integrated intensity by $^{13}$C NMR method.

TABLE 2

| Insulating Oil No. | Swelling Ratio of Film (%) | Corona Discharge Properties | | Number of Broken Capacitors | | | | |
| | | CSV (V/$\mu$) | CEV (V/$\mu$) | 80 (V/$\mu$) | 90 (V/$\mu$) | 100 (V/$\mu$) | 110 (V/$\mu$) | 120 (V/$\mu$) |
|---|---|---|---|---|---|---|---|---|
| 1 | 7.1 | 100.3 | 63.5 | — | — | 1 | 8 | 1 |
| 2 | 7.1 | 97.1 | 62.2 | — | — | 2 | 8 | — |
| 3 | 7.1 | 98.1 | 62.5 | — | — | 3 | 7 | — |
| 4 | 7.1 | 98.4 | 62.5 | — | 1 | 1 | 8 | — |
| 5 | 7.2 | 98.3 | 62.3 | — | — | 1 | 9 | — |
| 6 | 7.1 | 98.4 | 62.4 | — | — | 2 | 8 | — |
| 7 | 7.2 | 98.2 | 62.2 | — | — | 2 | 8 | — |
| 8 | 7.1 | 98.5 | 62.1 | — | — | 2 | 8 | — |
| 9 | 7.1 | 98.2 | 63.1 | — | — | 2 | 8 | — |
| 10 | 7.2 | 97.3 | 62.8 | — | 1 | 2 | 7 | — |
| 11 | 7.1 | 98.1 | 62.9 | — | — | 3 | 7 | — |
| 12 | 7.1 | 97.5 | 62.1 | — | — | 1 | 8 | 1 |
| 13 | 7.1 | 98.0 | 62.0 | — | — | 3 | 7 | — |
| 14 | 7.1 | 96.2 | 61.8 | — | 1 | 2 | 7 | — |
| 15 | 7.0 | 79.3 | 47.5 | 8 | 2 | — | — | — |
| 16 | 6.8 | 89.4 | 58.7 | 2 | 8 | — | — | — |
| 17 | 8.4 | 78.6 | 48.8 | 7 | 3 | — | — | — |

TABLE 2-continued

| Insulating Oil No. | Swelling Ratio of Film (%) | Corona Discharge Properties | | Number of Broken Capacitors | | | | |
|---|---|---|---|---|---|---|---|---|
| | | CSV (V/μ) | CEV (V/μ) | 80 (V/μ) | 90 (V/μ) | 100 (V/μ) | 110 (V/μ) | 120 (V/μ) |
| 18 | 8.5 | 79.2 | 49.1 | 8 | 2 | — | — | — |

What is claimed is:

1. An electrical insulating oil composition produced by bringing a by-product oil fraction comprising components with boiling points in the range of 260° to 330° C., atmospheric pressure, into liquid-liquid contact with an organic polar solvent by means of liquid-liquid extraction or extractive distillation and recovering the electrical insulating oil composition from the extract of liquid-liquid extraction or from the distillate of extractive distillation; said by-product oil fraction being formed by first preparing an alkylated product composed of unreacted benzene or unreacted toluene, ethylbenzene or ethyltoluene, polyalkylbenzenes and heavy components by alkylating benzene or toluene with ethylene in the presence of an alkylation catalyst, and then distilling said alkylated product to obtain said by-product oil fraction; said liquid-liquid extraction or said extractive distillation being conducted under conditions effective to produce said electrical insulating oil composition wherein the ratio of the integrated intensity as chemical shift at 120 to 155 ppm of the spectrum measured by $^{13}C$ NMR method to the total integrated intensity at 0 to 155 ppm of said spectrum is 70% or higher.

2. The electrical insulating oil composition according to claim 1, wherein a solubility parameter of said organic polar solvent is $5.1 \times 10^{-3}$ $(J/m^3)^{0.5}$ or higher.

3. The electrical insulating oil composition according to claim 2, wherein said organic polar solvent is selected from the group consisting of lower alcohols, ketones, ethers, cellosolves, glycols, dimethylsulfoxide (DMSO), N-methylpyrrolidone (NMP), sulfolane, acetonitrile, mixtures thereof and water mixtures thereof.

4. The electrical insulating oil composition according to claim 1, wherein said organic polar solvent contains 0 to 50 wt % of water.

5. An oil-filled electrical appliance impregnated with an electrical insulating oil composition produced by bringing a by-product oil fraction, comprising components with boiling points in the range of 260° to 330° C., atmospheric pressure basis, into liquid-liquid contact with an organic polar solvent by means of liquid-liquid extraction or extractive distillation and recovering the electrical insulating oil composition from the extract of liquid-liquid extraction or from the distillate or extractive distillation; said by-product oil fraction being formed by first preparing an alkylated product composed of unreacted benzene or unreacted toluene, ethylbenzene or ethyltoluene, polyalkylbenzeneses and heavy components by alkylating benzene or toluene with ethylene in the presence of an alkylation catalyst, and then distilling said alkylated product to obtain said by-product oil fraction; said liquid-liquid extraction or said extractive distillation being conducted under conditions effective to produce said electrical insulating oil composition wherein the ratio of the integrated intensity as chemical shift at 120 to 155 ppm of the spectrum measured by $^{13}C$ NMR method to the total integrated intensity at 0 to 155 ppm of said spectrum is 70% or higher.

6. The oil-filled electrical appliance according to claim 5, wherein at least a part of said oil-filled electrical appliance comprises a plastic material.

7. The oil-filled electrical appliance according to claim 6, wherein said plastic material is a polyolefin.

8. The oil-filled electrical appliance according to claim 7, wherein said polyolefin is polypropylene.

9. The oil-filled electrical appliance according to claim 5, wherein said oil-filled electrical appliance is an oil-filled capacitor.

10. The oil-filled electrical appliance according to claim 9, wherein said oil-filled capacitor has a structure in which a plastic film is wound.

11. The electrical insulating oil composition according to claim 1, wherein said liquid-liquid extraction is carried out under the condition that the extraction temperature is in the range of 10° to 150° C. and the amount of said polar solvent is in the range of 1 to 30 parts by weight per part by weight of said by-product oil fraction.

12. The electrical insulating oil composition according to claim 1, wherein said extractive distillation is carried out under the condition that said polar solvent is used in an amount of 1 to 30 parts by weight per part by weight of said by-product oil fraction and 20 or more separation stages are employed under a reduced pressure of 100 mmHg or lower.

13. The oil-filled electrical appliance according to claim 5, wherein a solubility parameter of said organic polar solvent is $5.1 \times 10^{-3}$ $(J/m^3)^{0.5}$ or higher.

14. The oil-filled electrical appliance according to claim 13, wherein said organic polar solvent is selected from the group consisting of lower alcohols, ketones, ethers, cellosolves, glycols, dimethylsulfoxide (DMSO), N-methylpyrrolidone (NMP), sulfolane, acetonitrile, and mixtures thereof and water mixtures thereof.

15. The oil-filled electrical appliance according to claim 5, wherein said organic polar solvent contains 0 to 50 wt % of water.

16. The oil-filled electrical appliance according to claim 5, wherein said liquid-liquid extraction is carried out under the condition that the extraction temperature is in the range of 10° to 150° C. and the amount of said polar solvent is in the range of 1 to 30 parts by weight per part by weight of said by-product oil fraction.

17. The oil-filled electrical appliance according to claim 5, wherein said extractive distillation is carried out under the condition that said polar solvent is used in an amount of 1 to 30 parts by weight per part by weight of said by-product oil fraction and 20 or more separation stage are employed under a reduced pressure of 100 mmHg or lower.

* * * * *

UNITED STATES PATENT AND TRADEMARK OFFICE
CERTIFICATE OF CORRECTION

PATENT NO. : 4,967,028

DATED : October 30, 1990

INVENTOR(S) : Atsushi Sato, et al.

It is certified that error appears in the above-identified patent and that said Letters Patent is hereby corrected as shown below:

In the Abstract, line 12: "benene" should read as --benzene--

Column 1, line 56: "structurs" should read as --structures--

Column 3, line 23: "fracation" should read as --fraction--

Column 3, line 57: "abovementioned" should read as --above-mentioned--

Column 4, line 27: "allover" should read as --all over--

Column 4, line 67: "prepar" should read as --prepare--

Column 9, line 13, Claim 1: "pressure, into" should --read as --pressure basis, into--

Column 9, line 56, Claim 5: "polyalkylbenzeneses" should read as --polyalkylbenzenes--

Signed and Sealed this

Seventh Day of April, 1992

*Attest:*

HARRY F. MANBECK, JR.

*Attesting Officer*  *Commissioner of Patents and Trademarks*